July 8, 1930. A. ANDERSON 1,770,224
BOREHOLE DIRECTIONAL APPARATUS AND METHOD OF ORIENTATION
Filed Aug. 15, 1924 4 Sheets-Sheet 2
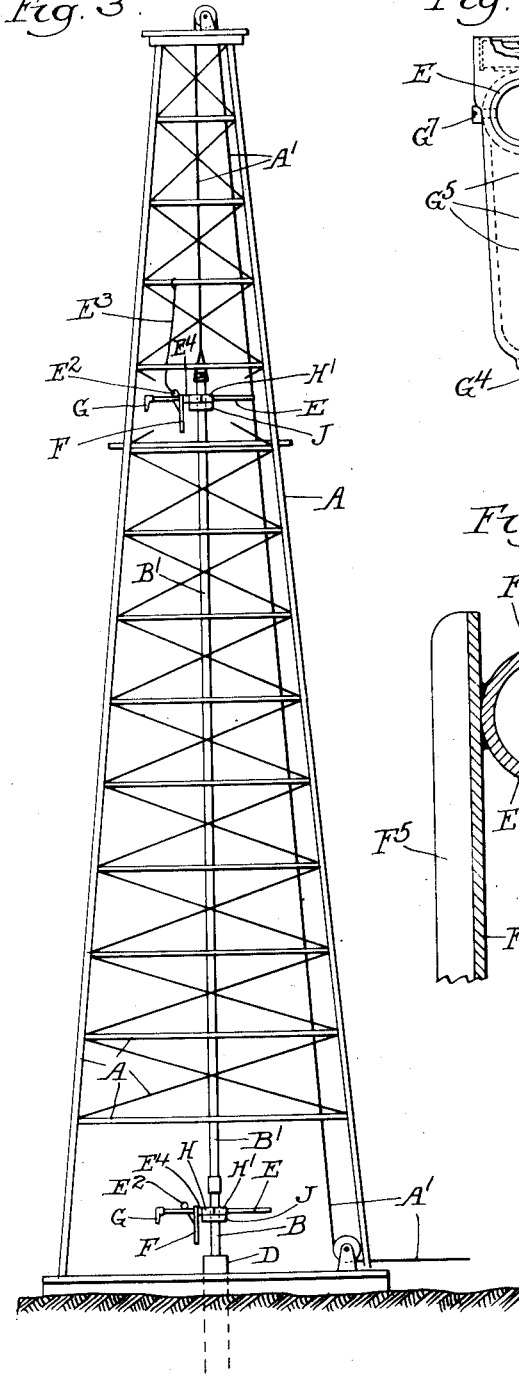
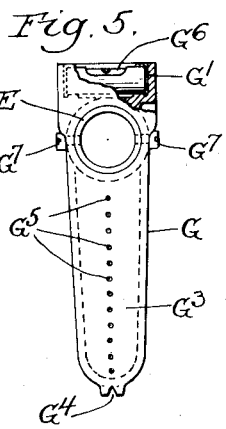
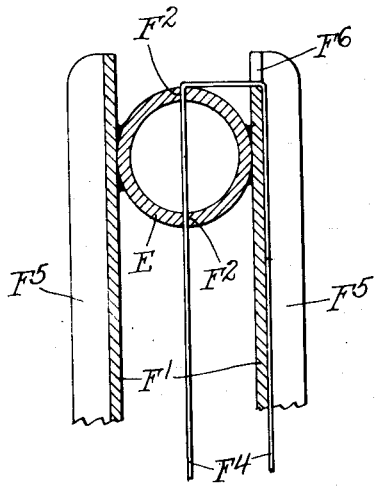
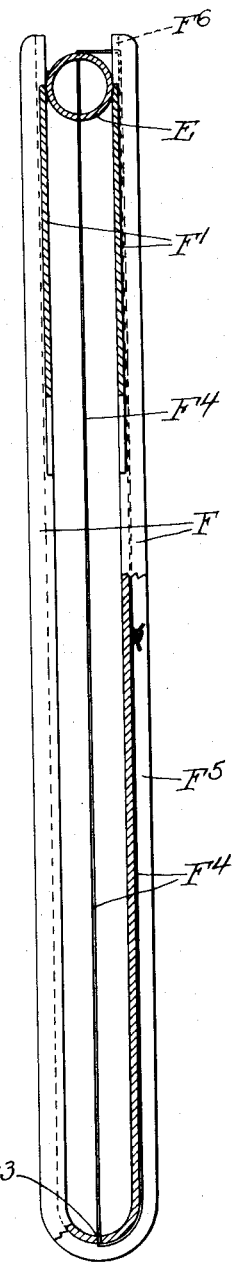
Inventor
Alexander Anderson.
by Parker & Carter
Attorneys.

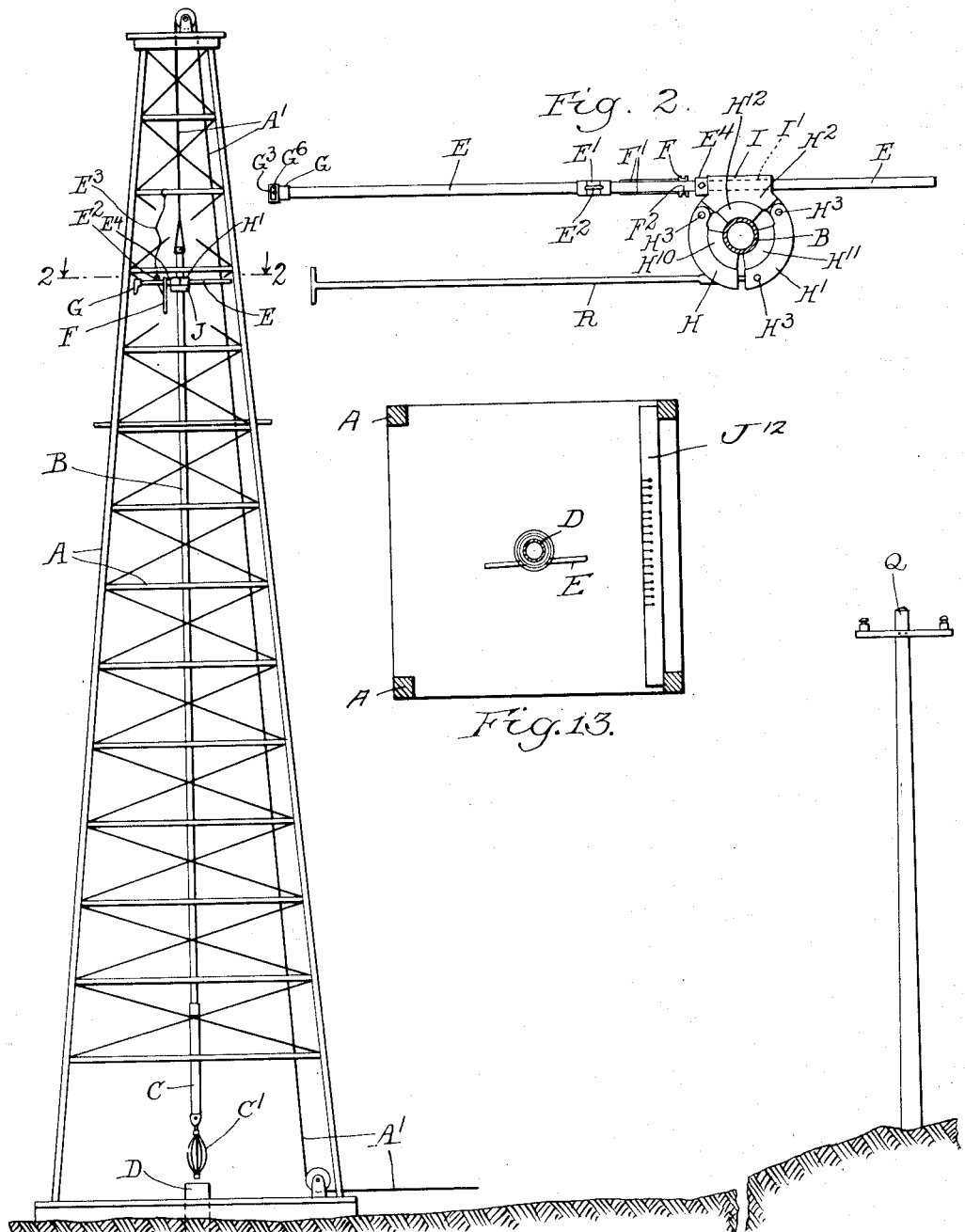

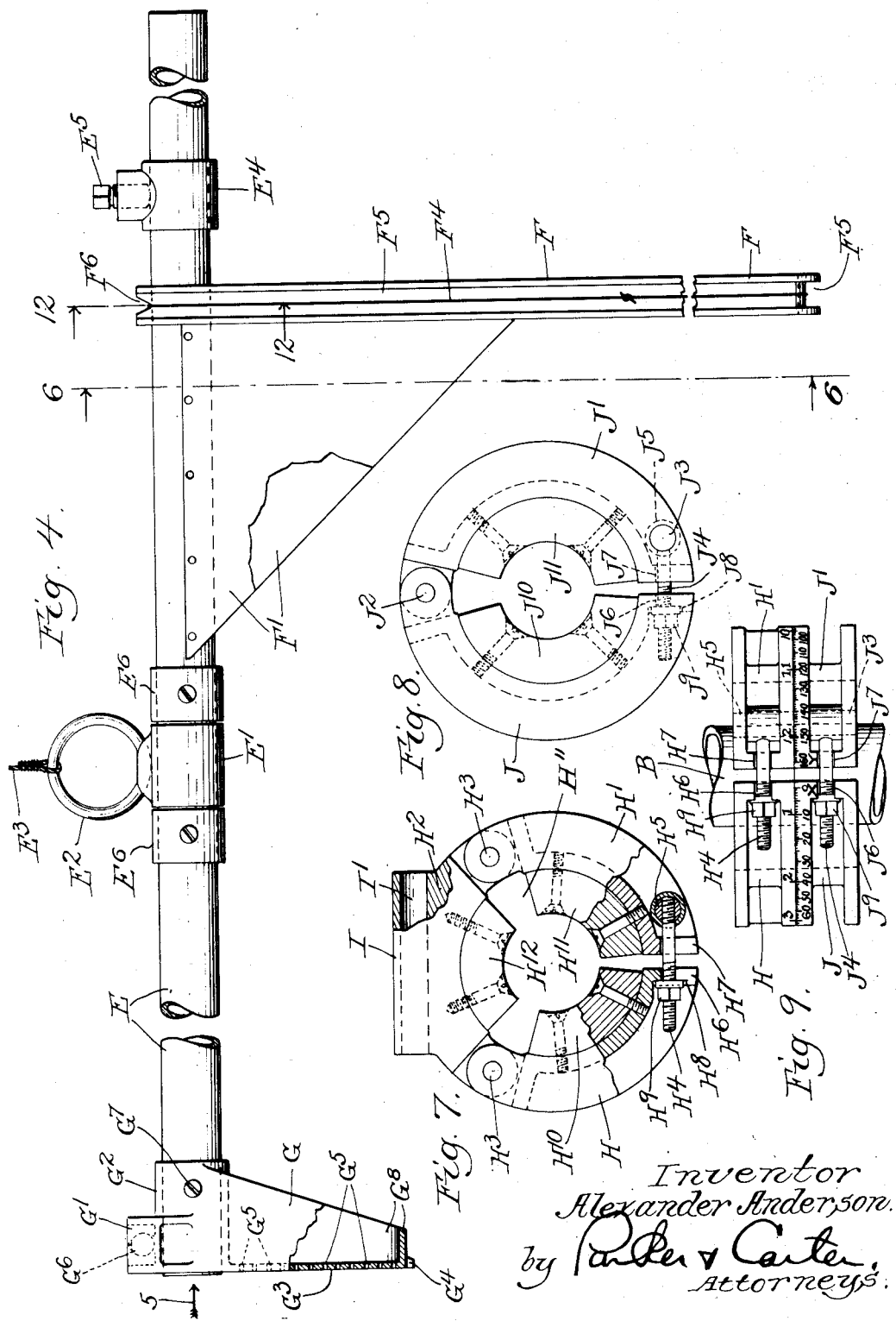

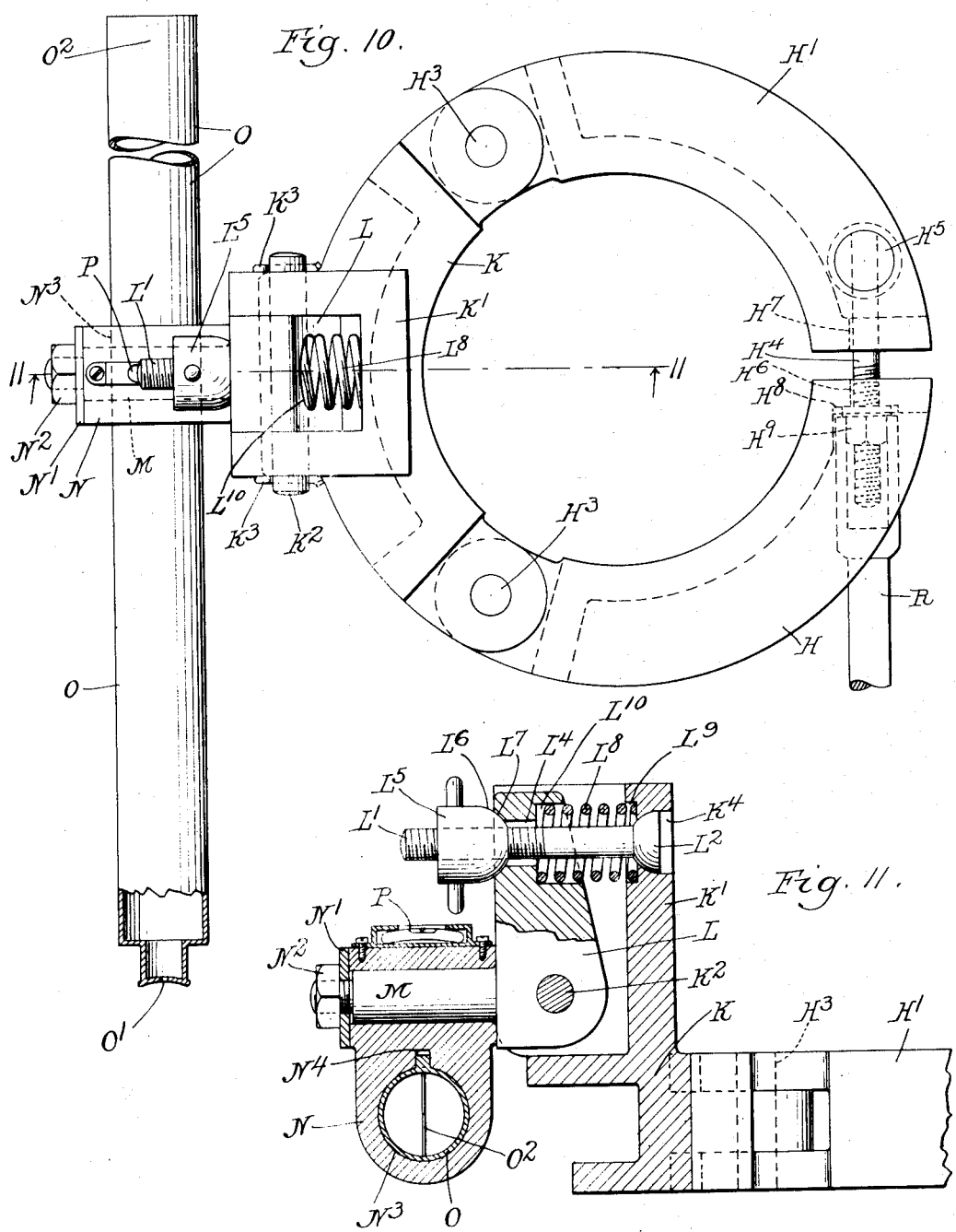

Patented July 8, 1930

1,770,224

UNITED STATES PATENT OFFICE

ALEXANDER ANDERSON, OF FULLERTON, CALIFORNIA

BOREHOLE DIRECTIONAL APPARATUS AND METHOD OF ORIENTATION

Application filed August 15, 1924. Serial No. 732,145.

This invention relates generally to an apparatus and process for surveying bore holes. The survey of any bore hole is completed when the bore hole is divided into a suitable number of successive parts and the length, inclination, and direction of inclination of each part is determined and known. The present invention may be used in connection with any known type of bore hole surveying apparatus which is adapted to be run into the bore hole, attached to a line of pipe or rods the use of which requires knowledge of the orientation of the line of pipe as it is passed into the bore hole. The invention may also be used in conjunction with impression blocks, deflecting wedges, and any other tools operating in the bore hole. Thus where a tool has been broken in a bore an orientated impression may be obtained and the fishing tool may be accurately run in on a known orientation so as to slide exactly over and fit the broken tool. Many other uses of the device and process will readily present themselves.

One object of this invention is to provide new and improved methods and apparatus for accurately and rapidly determining the orientation of, or for accurately and quickly orienting a line of pipe or rods as it is passed into the hole for the above purpose. Another object of the invention is to determine the orientation of the tool or other body already within the bore hole. Another object is properly to place in oriented relation with a tool or other body, already in the hole, a second tool, impression block or other part. Other objects will appear from time to time throughout the specification and claims.

My invention is illustrated more or less diagrammatically in the accompanying drawings, wherein:

Figure 1 is a diagrammatic side elevation of a derrick with a stand pipe in position at the time of starting to carry out a survey, and with my device located for use;

Figure 2 is a plan view on an enlarged scale of my sighting device, in part section on the line 2—2 of Figure 1;

Fig. 3 is a side elevation in part similar to Figure 1 with a second sighting device in place, showing a latter stage in the surveying operation;

Figure 4 is a side elevation on an enlarged scale of the sighting device;

Figure 5 is an end view of the same with parts in section looking in the direction of the arrow 5 in Figure 4;

Figure 6 is a view on an enlarged scale taken from the opposite end of the sighting device shown in Figure 4, with parts in section, generally on line 6—6 of Figure 4;

Figure 7 is a plan view with parts broken away of the upper clamping member;

Figure 8 is a similar view showing the lower clamping member;

Figure 9 shows the two in position on a pipe;

Figure 10 illustrates a modified form, the clamp being generally the same as that shown in Figure 7 but using instead of the sighting device shown in the previous figures, a telescope;

Figure 11 is a partial vertical cross section taken on line 11—11 of Figure 10;

Figure 12 is a sectional view taken on the line 12—12 of Figure 4 showing the barrel on an enlarged scale.

Fig. 13 is a sectional view, taken in a horizontal plane, near the bottom of a derrick such as is shown in Fig. 1, and illustrating a modified arrangement of apparatus for practicing my invention.

Like parts are indicated by like characters throughout.

A is a derrick used in making the bore. $A^1$ is a line by means of which pipe, rods or other materials may be lowered into the bore. B is a stand of pipe about to be lowered into the bore. C is a surveying tool located on the lower end of the stand of pipe. This device is not described in detail here because its details form no part of the present invention.

D indicates the lining of the bore hole. E is a sighting device fastened on the pipe B by means of clamps which will be described later.

As shown particularly in Figure 4, 5, and 6 the sighting device E is composed of a barrel which has mounted upon it a sleeve $E^1$ in which is fixed a suspension ring E³. The sleeve is free to revolve about the barrel between fixed collars E⁴. To the ring is attached a line E³ by means of which the sighting device is fastened to a part of the framework to prevent accidental dropping as the device is moved and manipulated. Adjacent one end of the sighting device is a collar E⁴ which is provided with the set screw E⁵. The collar may be moved along the barrel of the sighting device and fixed in position by the set screw E⁵.

The barrel or sighting device E carries a U-shaped part F welded or otherwise suitably fastened to the tube, and preferably rigidly supported by gusset pieces F¹ F¹. A hole F² is formed through the barrel centrally and passes vertically down through it. This hole is located centrally with respect to the U-shaped part F. F³ is a hole in the lower end of the U-shaped part F. It is located in line with the hole F² above described. A hair, wire, or elastic F⁴ passes through the holes F² F³ bisecting the U-shaped opening in the part F. In the outer side of the U-shaped part F is a trough or depression F⁵ within one side of which a portion of wire or elastic F⁴ is located. A notch F⁶ is provided in the top of the device for the protection of the elastic.

At the opposite end of the sighting device is located a member G. It has a trough-shaped opening G¹ in its upper side. It is provided with a generally cylindrical portion G² which is drilled to fit the tube E and is provided with a generally plain rear wall G³ which is strengthened by a surrounding lip as shown.

An open V-sight G⁴ is located in a central position in a projection on the exterior of the lowest point of the wall G³. A plurality of sight holes G⁵ G⁵ are provided in the rear wall G³ along a line joining the center of the tube E and the open sight G⁴. A spirit or other level G⁶ is attached within the trough G¹ and lies transversely to the tube E. This level is so adjusted that with this level the line of holes G⁵ is in a vertical plane.

In assembling the device the part G is revolved about the tube E until the line of holes G⁵ is parallel with the center wire F⁴. When the parts are in this position the member G is rigidly attached to the tube by means of set screws G⁷, and normally remains in that position thereafter.

I shall now describe the clamping devices shown in detail in Figures 7, 8 and 9. In Figure 7, as above noted, the upper clamp is shown. This clamp is made of three segments H, H¹, H². The segments H, H¹ are hinged to the segment H² at two points H³ H³. At their free ends they are detachably secured together by a bolt H⁴. This bolt H⁴ is mounted in a pin H⁵ which is pivoted in the segment H¹. The ends of the segments H, H¹ are slotted at H⁶ H⁷ respectively to receive the bolt H⁴. A circular recess H⁸ is provided in the segment H, and in this recess a nut H⁹, which is located on the end of the bolt H⁴, is received and retained even when it is not fully tightened up. The inner surfaces of the segments are segments of a cylinder made on the same radius as the pipe which they are designed to fit accurately. Opposite the hinges H³ are recesses. The lower surface of the upper clamp member shown in Figure 7 is made flat and at right angles to the cylindrical surfaces of the inner faces of the segments. The outer edges are made cylindrical and concentric with the inner surface of the segments.

The outer surfaces of the upper clamp have index points from 1 to 12 engraved upon them. While I have chosen these index points as numbered, it is obvious that others might be used, and I am not limited to this particular number or arrangement of index points.

The segment H² has a projection I through which a cylindrical hole I¹ passes. This hole I¹ is made to have a sliding fit for the front end of the sighting device barrel E.

The sliding stop E⁴ mentioned above may be fixed at any convenient position for the purpose of keeping the sight holes G⁵ at a suitable point from the pipe. The clamp which receives the sighting device is normally placed in position about a portion of the stand of pipe and the front end of the sighting device is then inserted in the hole I¹ of the clamp.

I shall now describe the lower clamp shown particularly in Figures 8 and 9. This clamp is made up of two segments J, J¹ which are hinged together as shown at J². The inner surfaces of the segments J, J¹ are made accurately to the same radius as the pipe which they are intended to fit, except for two recesses, one opposite the hinge J² and the other opposite the opening point of the clamp. J³ is a pin mounted for rotation in the clamp segment J¹. It carries a bolt J⁴. The pin is preferably retained in a sleeve J⁵ which surrounds it. The ends of the segments J, J¹ are slotted at J⁶ J⁷ respectively. A circular recess J⁸ secures the nut J⁹ in position even if it is not fully tightened up.

The top side of the clamp is made flat and at right angles to the cylindrical inner surface of the clamp segments. The outer surface of the clamp segments is made cylindrical and concentric with the inner cylindrical surface. The part J¹ of the clamp has a scale of degrees Y engraved on its upper edge, and the part J also has a scale of degrees, X, engraved on its upper edge, each starting at zero.

It will be obvious that the markings of the scales X and Y could be made upon the upper clamp, and that the index markings could be made or engraved upon the lower clamp. Such alternative locations of the scale and index on the clamps, clearly, would not affect, in any way, the practice of this invention.

In Figures 10 and 11 I illustrate a modified form. As shown in Figure 10 the upper clamp appears. The two segments H, H¹ of this clamp are identical in construction and shape to those shown in Figure 7. The segment K, however, differs somewhat from that shown in Figure 7. This segment is an alternative form and may replace the segment H² shown in Figure 7 in the upper pipe clamp. The inner surface of this segment is cylindrical and is exactly similar to the inner surface in the segments shown in Figure 7 and the hinge arrangements are identical to those shown in Figure 7. The segment K has a bracket K¹ formed on its upper side. A cylindrical pin K² passes through holes in the bracket and is retained by cotter pins K³ K³. The lower end of a member L is fixed in position on the pin K². L¹ is a bolt which has a hemispherical head L² which lies within a socket K⁴ of the bracket K¹. This bolt passes through an enlarged hole L⁴ in the member L. L⁵ is a nut on the bolt L¹ and is provided with a hemispherical face L⁶ which rests in a socket L⁷ adjacent the end of the perforation L⁴ in the member L. L⁸ is a coiled helical spring positioned between the member L and the bracket K¹ about the bolt L¹. It is normally kept under compression between the bracket K¹ and the member L and its ends are received in recesses in the two members.

M is an axis member projecting from the lower portion of the member L at right angles to the axis of the pin K². The socket member N is held on this axis by a washer N¹, and the nut N². Within the socket member N is formed a cylindrical socket N³ which carries a sighting tube O, and this socket N³ is at right angles to the axis member M. N⁴ is a keyway along the top of the socket N³.

P is a spirit level attached to the top of the socket member N in a position parallel to the axis member M. The sighting tube O has a small peep-hole centrally located at its axis O¹ and a vertical hair O² passes through the axis near the end of the tube. In place of the sighting tube O a telescope might be used.

Although I have shown an operative device, still it will be obvious that many changes might be made in size, shape and arrangement of parts without departing materially from the spirit of my invention; and I wish, therefore, that my showing be taken as in a sense diagrammatic. Thus in Figures 2, 7, 8 and 9 I show wooden liner blocks H¹⁰, H¹¹ and H¹². These might be omitted, or others of a different size might be substituted so that clamps could be used in connection with pipes of a different size.

Where, in the claims and specification I have used the word "pipe" I mean pipe, rod, or other elongated member. My invention is not of course limited to the use of pipe. For many purposes a rod, pole, or other elongated object would be used, the rods or poles would normally be in quantities being joined together end to end like the sections of pipe. Therefore, where the word "pipe" is used it is to be understood as referring to any elongated object which could be used in the manner herewith described.

The use and operation of my invention are as follows:

A clearly defined point or object visible from the upper part of the derrick is selected for example the telegraph pole Q. A first stand of pipe B is suspended over the mouth of the bore hole, a surveying device, or other tool C is rigidly attached to the lower end of the pipe B. The member C and the pipe B are placed in a known position in azimuth, and a lower clamp, such as that shown in Figure 8, is firmly attached about the pipe near the top of the stand. The upper clamp shown particularly in Figure 7 is placed around the pipe, resting on the lower clamp, but not completely tightened up upon the pipe. The front end of the tube of the sighting device is pushed into the socket in the upper clamp and the stop member E⁴ is permanently fixed at a convenient point on the tube or barrel of the sighting device.

Using the barrel of the sighting device as a lever, the upper clamp is moved around the pipe until the line of sight falls approximately on the distant object. The barrel of the sighting device is then revolved until the bubble in the spirit level upon it is exactly at a horizontal position. The line of sight is then exactly trained on the distant object and the nut on the upper clamp is tightened preferably by a long handled wrench R (Figs. 2 and 10), thus locking the upper clamp in position upon the pipe.

Several targets or pickets are now spaced apart on the ground on a line with the distant object and in a vertical plane with the central wire F⁴; the line of targets is sufficiently extended to permit at least one of them to be visible from the derrick floor.

The remaining targets are useful because they allow of the choice of points to sight on when parts of the derrick interfere with direct vision of the original distant object.

When this preliminary sighting operation has been carried out, the sighting device is withdrawn from the upper socket and the stand of pipe carrying the two firmly fixed clamps near its upper end, is lowered until these clamps are near the derrick floor. A second stand of pipe B¹ is now screwed into the first and the pipe is again suspended. The clamps, now near the derrick floor, were locked in position on the pipe while they were up in the derrick. After being lowered to the derrick floor a sighting device is again inserted in the socket of the upper clamp which still remains locked to the pipe and the pipe itself is rotated until the sighting device is trained on the target. Another pair of clamps is attached near the top of the second stand, the upper clamp being left loose as before. The pipe is allowed to remain in this position until the process of inserting the sighting device and orienting and tightening the upper clamp at the top of the second stand has been completed. The first pair of clamps is now removed from the pipe which is lowered into the hole until the second pair of clamps is in turn near the derrick floor.

A third stand of pipe is screwed on with a third pair of clamps attached near the top; the pipe is again turned until a sight taken from the second pair of clamps near the derrick floor falls on the original target. The pipe is again held in this position until the third pair of clamps is sighted in and tightened up, after which the second pair is removed and the pipe again lowered. This cycle of operation is repeated with each stand of pipe until all of it has been run into the hole. Thus the entire string of pipe and any bore hole surveying instruments, impression blocks, wedges or other devices which may be attached to it, are passed into the hole on a constant azimuth.

A modification of the above method consists in measuring the angular turn of the pipe as each stand is passed into the hole. The algebraic sum of these quantities gives the exact orientation at any point, and with this method a repeated turning of the pipe is avoided. In the modified method, the lower of the first pair of clamps is clamped firmly to the first stand of pipe at a point near the upper end of that stand of pipe, the upper of the first pair of clamps is placed around the pipe above that lower clamp, the sighting device is aligned with the chosen plane of direction by sighting it upon the chosen target, and the upper clamp is clamped to the pipe. The first stand of pipe is then lowered and the second stand is screwed on. Then before moving the pipe, the relation of one of the index points 1, 2, 3, etc., of the first pair of clamps, with respect to one of the scales X or Y of the first pair of clamps is noted. For example, index point 2 may coincide with the 105° mark on scale X. Then the upper clamp of this first pair of clamps is loosened, and rotated until the sighting device is sighted on the target, and the relative position of index point 2 with respect to scale X is noted. For example index point 2 may then coincide with the 123° mark on scale X. In the example descrbed the pipe and the attached survey device rotated 18° to the left from its initial position. Before the pipe is moved again a second pair of clamps is similarly attached to and sighted in at the top of the second or last added stand of pipe. These operations are repeated until the pipe has been lowered to the desired depth, and the algebraic sum of the rotations so measured, that respectively occurred during the lowering of the pipe after the addition thereto of each stand gives the total rotation of the lower end of the pipe. Similarly, the algebraic summation of the appropriate rotations measured will give the total rotation at any depth with respect to which that information is desired, as a constant record of the rotational position of the pipe is made by the operations above described.

Instead of taking the angular readings from graduations on the clamps, they may be obtained by sighting on and reading a graduated scale placed on the derrick floor, and preferably graduated to right and left from a central zero located on the line of sight of the target. These two latter methods save most of the time required for turning the pipe and also have the advantage of allowing the pipe to slide into the hole in a natural manner and leaving it undisturbed in the position it has already taken up. Fig. 13 of the drawings, shows, diagrammatically, the use of a graduated scale-board $J^{12}$, to be positioned at a suitable height above the derrick floor. This scale, in practice, may be conveniently secured upon the derrick floor, and on the side of the derrick which faces in the direction of the distant sighting object Q shown in Fig. 1. This scale is so positioned that a substantially mid-point, to be used as the zero point, will lie in the line of the chosen direction or azimuth. When using such a scale, only the sighting clamp is required to be used on the pipe. This clamp is placed upon the upper end of a pipe section, and rotated until the line of sight of the sighting device falls exactly on the distant target Q. The clamp is then secured to the pipe in that selected position, and the pipe section with the clamp attached is lowered until the clamp approaches the derrick floor, or about the level of the scale-board $J^{12}$. At this level, a sighting device is again inserted in the clamp, and sighting upon the scale board, a reading is taken, which may be either to the right or left of the zero mark on the scale. Such reading then will be an accurate measure of the amount and direction of rotation of the pipe incidental to its lowering; and as the process of adding sections, in lowering the pipe into a bore hole is repeated, or removing sections in raising or removing the pipe from the bore hole, the algebraic sum of the readings from the scale board $J^{12}$ (these readings being positive on one side of the zero mark and negative on the other side) will measure or determine the total rotational movement of the pipe.

From the foregoing it is apparent that in the practice of my invention the orientation of the inner-most end or any other part or section of a line of pipe in an elongated hole, or of a device fixed to such inner-most end or to any other part of the pipe, may be accomplished by keeping a record of the rotational movement of the pipe as it is inserted into or withdrawn from the bore hole. It will also be apparent that in keeping a record of such rotation, in accordance with my invention, one member, for example a lower clamp, is mounted upon the pipe in fixed relation thereto or for rotation therewith, and another member, such as for example, an upper clamp adjustable on the pipe or a scale board mounted on a stationary part, is adapted to be adjusted to or fixed in known relation to a chosen line of direction, to the end that a determination of the extent and direction of movement of one member with respect to the other will indicate the extent and direction of rotation of the pipe as it moves along the hole. In the determination of extent and direction of relative movement of two parts by means of a scale carried by one part and an index carried by the other, it is obviously immaterial which part carries the scale so long as the other part carries the index that cooperates with the scale. In the use of a member fixed to the pipe and a member adjustable to or fixed in known relation to a chosen direction in the practice of my invention, one of such parts carries a scale indicating angles of rotation and the other member carries an index of some kind, such as, for example, the index points 1, 2, 3, and so forth, on one of the clamps or the sighting device for determining angles of rotation from a scale mounted on a stationary member. It is therefore apparent that such a scale may be carried by the derrick floor, or by one of two cooperating clamp members mounted on the pipe. The only important requirement is that either the member that carries the scale or the member that carries the index cooperating with the scale shall be brought to a chosen line of direction at the time an initial or rotated position of the pipe is determined.

Under certain circumstances, particularly where the operator who manipulates the sighting device at the top of the pipe has to work in a very confined space, the segments of the upper clamp shown in Figures 7 and 8 are replaced by a modified form shown in Figures 10 and 11. This modified apparatus is used in exactly the same way as the first described form, except for the mechanical arrangement of its parts. To bring the spirit level to a horizontal position, the nut $L^5$ is manipulated and when the bubble indicates that it lies in a horizontal position, the axis M is truly horizontal, and the vertical hair $O^2$ about the sighting tube lies in a truly vertical position in which it remains during movement of the tube on the axis M.

From the foregoing it will be apparent that in the practice of this invention the sighting of the sighting device upon the target aligns the sighting device with the chosen plane of direction, and that the tightening upon the pipe of the clamp that carries the sighting device determines the rotational relation, to the chosen plane of direction, of the pipe and of the impression block or survey instrument or other device attached to the pipe. The rotational relation of the pipe or device to the chosen plane of direction is determined by this operation because the clamping to the pipe of the sighting device that is sighted upon the target definitely indicates what diameter or radius of the pipe is aligned with or parallel to the chosen plane of direction. If, after the pipe is moved in the bore the sighting device is no longer sighted on the target, but must be rotated with respect to the axis of the pipe in order to sight it on the target, then the amount of rotation necessary is a measure of the rotation of the pipe that occurred during the movement thereof in the bore. The sighting device may be rotated with respect to the pipe until it is again sighted on the target, and the extent of that rotation measured; or, without loosening the clamp which carries the sighting device, the pipe may be rotated until the sighting device is again sighted upon the target. Either of these operations comprises a determination of the rotational relation of the pipe with respect to the chosen line after a movement of the pipe longitudinally of the bore.

I claim:

1. In apparatus for determining the orientation of a device supported by a line of pipe for movement within a bore, means for supporting the pipe for longitudinal movement within the bore, a member mounted upon the pipe and held against rotation with respect thereto, a second member adapted to be positioned in known relation to a chosen plane of direction, one of said members being provided with a scale member for the measurement of angles of rotation with respect to the chosen plane of direction and the other of said members being provided with an indicating element cooperating with said scale to indicate thereon the extent and direction of rotation of the pipe with respect to the chosen plane of direction during longitudinal movement of the pipe within the bore.

2. In a method of determining the orientation of a device that is moved within and longitudinally of a bore hole to different points along the length thereof, the steps comprising initially determining the rotational relation of the device with respect to a chosen plane of direction, moving the device along within and longitudinally of the bore in stages, and determining the rotational relation of the device between stages with respect to said chosen plane of direction.

3. In a method of determining the orientation of a device that is moved within and longitudinally of a bore hole to different points along the length thereof, the steps comprising initially determining the rotational relation of the device with respect to a chosen plane of direction, moving the device along within and longitudinally of the bore in stages, and measuring the extent and direction of rotation of the device that occurs during each such stage of its movement.

4. In a method of determining the orientation of a device that is progressively moved within and longitudinally of an earth bore, at any point of such movement, while fixed to an elongated member, the steps comprising initially determining the rotational relation of the device about its axis with respect to a chosen plane of direction, moving the device within and longitudinally of the bore hole by moving the elongated member in the bore hole, and successively measuring at a given station the extent and direction of rotation about its axis of each of successive units of length of the member that occurs during the movement of the respective units of length of the member past said station as the member is moved along the bore.

5. In a method of determining the orientation at any desired point within a bore hole of a device that is moved within and longitudinally of the bore hole by means of a sectional elongated member, the steps comprising initially determining the rotational relation of one section of the member with respect to a chosen plane of direction, successively altering the length of the member one section thereof at a time and moving the device along the bore by moving the elongated member therein while permitting it to partake of such rotation as is incident to its movement in the bore, and successively measuring the extent and direction of rotation of each section of the member, by which the length of the member is altered, that occurs during movement of the member longitudinally of the bore, whereby the algebraic sum of the rotations of the sections defines the change in the orientation of the device.

6. In a method of determining the orientation of one section of an elongated member composed of connected sections and moved along within and longitudinally of a bore hole, the steps comprising successively altering the length of the member by one section and moving the member along in the bore, determining the rotational relation with respect to a chosen plane of direction, of each section, by which the length of the member is altered, after the section is added to the member but before the member is moved, and measuring the extent and direction of rotation of the section with respect to said plane after the member is moved a distance substantially equal to the length of such section.

7. In a method of determining the orientation of an elongated member that is moved longitudinally of and within a bore hole for a desired distance, the steps comprising fixing to the member a second member aligned in a chosen direction, moving the elongated member longitudinally of the bore in a desired direction through a predetermined distance, bringing the second member again into alignment with the chosen plane of direction, and repeating the operations until the elongated member has been moved longitudinally of the bore hole for the desired distance.

8. In a method of determining the orientation of an elongated member that is moved longtudinally of and within a bore hole for a desired distance, the steps comprising fixing to the member a second member, determining the orientation of the said second member with respect to a chosen plane of direction, moving the elongated member longitudinally of the bore in a desired direction through a predetermined distance, then measuring the angle between said second member and the chosen plane of direction, and repeating the operations until the elongated member has been moved longitudinally of the bore hole for the desired distance.

9. The steps in a method of measuring the rotation of a pipe as it is lowered section by section in a bore hole which comprise releasably fixing a sighting device near the upper end of a section of pipe, aligning the same in a known direction, lowering the section of pipe, releasing the sighting device so that it may be turned about the pipe, re-aligning it in the known direction, measuring the angle through which the sighting device has been turned on the pipe to determine the extent of rotation of the pipe from the known direction, fixing a second sighting device upon a second section of pipe attached above said first section, aligning said second sighting device with said known direction, removing said first sighting device, lowering the line of pipe and similarly repeating the operations of measuring the angle through which the line of pipe is rotated during this lowering.

10. A sighting device for use in determining the orientation of a line of pipe in a bore hole which includes two removable clamping devices, each of such devices having measuring marks upon them and being adapted to be mounted on said pipe, a first one of said devices being adapted to be clamped against relative motion with respect to said pipe, a second one of said devices being adapted to receive a sighting instrument for sighting along a line at an angle to the axis of the pipe, and said second device being adapted to be moved with relation to said first device and adapted through such movement and by means of such measuring marks to measure the amount of rotation of said pipe.

11. A measuring assembly for use in determining the rotation of a line of pipe in a bore hole which includes two removable clamping devices adapted to be positioned upon said pipe, one of such clamping devices having measuring marks upon it and the other being provided with an index, and the clamping devices being adapted to be moved one with relation to the other and adapted through such movement and by means of such marks to measure the amount of rotation of said pipe.

12. A sighting assembly for use in determining the orientation of a line of pipe in a bore hole which includes a removable measuring device adapted to be positioned on said pipe and an adjustable and removable sighting device adapted to be positioned upon such measuring device and to be used in connection therewith, the measuring device having clamping parts adapted to hold it fixed upon said pipe during its movement, and the sighting device being adapted to be rotated about said pipe after movement of said pipe and thus to indicate with relation to the measuring device the rotation of the pipe during its movement in the bore hole.

13. In a method of determining the orientation of a device at any point in a bore hole within and longitudinally of which the device is moved, the steps comprising securing the device to an elongated member, initially determining exteriorly of the bore hole the rotational relation of the device and the elongated member with respect to a chosen plane of direction, moving the device by stages along within and longitudinally of the bore by moving the elongated member while permitting such rotation of the member as is incident to its longitudinal movement, and between stages of movement measuring the extent and direction of rotation of the device and the elongated member.

14. A sighting device for use in determining the orientation of a line of pipe in a bore hole which comprises in combination, a sighting member, means for supporting said member on said pipe for rotation about the axis thereof and for sighting upon a fixed object distant from the pipe, means for holding said member against such rotation, and means for measuring rotation of said sighting member with respect to the axis of the pipe.

15. In a method of moving a line of pipe longitudinally of and within a bore hole and measuring the rotation of the pipe incident to such movement, the steps comprising mounting two relatively rotatable members on the pipe, fixing the rotational position of one member with relation to the pipe and adjusting the other member until it occupies a definite rotational position relative to a chosen plane of direction, moving the pipe along the bore hole, and then realigning the adjustable member until it again occupies its original adjusted rotational position with relation to the chosen plane of direction, and measuring the amount of the turning in the second adjustment of one member relative to the other to measure the angle through which the pipe has rotated in its movement along the bore.

16. In an assembly for measuring the rotation of a line of pipe in a bore hole which includes two parts adapted to be removably positioned upon said pipe, one part constituting a support for the other and having clamping means to detachably secure it to the pipe, one of said parts having measuring marks thereon, the other part being provided with an index, the two parts being adapted to be moved one with relation to the other, and through such movement and by means of such marks to measure the amount of rotation of said pipe.

17. In an assembly for use in measuring the rotation of a line of pipe in a bore hole which includes means bearing an index and carried on the pipe, and a measuring device for cooperation therewith having a surface shaped to conform to the exterior contour of the pipe and adapted to be positioned with the said surface in contact with the pipe, there being measuring marks on said device to be read against said index, and aligning means connected with said measuring device for locating the said device on the pipe in a known rotational position with relation to a chosen plane of direction.

18. The method of orienting a device that is moved along a bore-hole attached to a line of pipe and which device is moved by movement of the pipe in stages, the steps comprising fixing a sighting member on the pipe in such relative position thereto that the line of sight is in a chosen plane of direction, and between stages of movement of the device along the bore, turning the pipe and the member fixed thereto about the axis of the pipe until the rotational position of the pipe is such that the line of sight of the sighting member is again in the chosen plane of direction.

Signed at Chicago, county of Cook and State of Illinois, this 13th day of August, 1924.

ALEXANDER ANDERSON.